(12) United States Patent  
Miller et al.

(10) Patent No.: US 9,790,834 B2
(45) Date of Patent: Oct. 17, 2017

(54) METHOD OF MONITORING FOR COMBUSTION ANOMALIES IN A GAS TURBOMACHINE AND A GAS TURBOMACHINE INCLUDING A COMBUSTION ANOMALY DETECTION SYSTEM

(71) Applicant: General Electric Company, Schenectady, NY (US)

(72) Inventors: Karen Warren Miller, Marietta, GA (US); Robert Joseph Iasillo, Atlanta, GA (US); Matthew Francis Lemmon, Marietta, GA (US)

(73) Assignee: General Electric Company, Schenectady, NY (US)

( * ) Notice: Subject to any disclaimer, the term of this patent is extended or adjusted under 35 U.S.C. 154(b) by 574 days.

(21) Appl. No.: 14/220,775

(22) Filed: Mar. 20, 2014

(65) Prior Publication Data

US 2015/0267591 A1   Sep. 24, 2015

(51) Int. Cl.
*F01N 11/00* (2006.01)
*F01D 17/08* (2006.01)
(Continued)

(52) U.S. Cl.
CPC .......... *F01N 11/002* (2013.01); *F01D 17/085* (2013.01); *F01D 21/00* (2013.01);
(Continued)

(58) Field of Classification Search
CPC combination set(s) only.
See application file for complete search history.

(56) References Cited

U.S. PATENT DOCUMENTS 3,775,745 A   11/1973   Kelley
3,892,975 A   7/1975   Yannone et al.
(Continued)

FOREIGN PATENT DOCUMENTS

EP   042952 A1   5/1991
EP   0945606 A2   9/1999
(Continued)

OTHER PUBLICATIONS

PCT Search Report and Written Opinion issued in connection with corresponding PCT Application No. PCT/US2015/020157 on May 27, 2015.

*Primary Examiner* — David Walczak
(74) *Attorney, Agent, or Firm* — Ernest G. Cusick; Frank A. Landgraff

(57) ABSTRACT

A method of monitoring for combustion anomalies in a gas turbomachine includes sensing an exhaust gas temperature at each of a plurality of temperature sensors arranged in an exhaust system of the gas turbomachine, comparing the exhaust gas temperature at each of the plurality of temperature sensors with a mean exhaust gas temperature, determining whether the exhaust gas temperature at one or more of the plurality of temperature sensors deviates from the mean exhaust temperature by a predetermined threshold value, and identifying an instantaneous combustion anomaly at one or more of the temperature sensors sensing a temperature deviating from the mean exhaust temperature by more than the predetermined threshold value.

14 Claims, 3 Drawing Sheets

(51) Int. Cl.
  *F02C 9/00* (2006.01)
  *G01K 3/06* (2006.01)
  *F01D 21/00* (2006.01)
  *F01D 21/12* (2006.01)
  *F02C 9/28* (2006.01)
  *G01M 15/14* (2006.01)
  *G01K 13/02* (2006.01)

(52) U.S. Cl.
  CPC .......... *F01D 21/003* (2013.01); *F01D 21/12* (2013.01); *F02C 9/00* (2013.01); *F02C 9/28* (2013.01); *G01K 3/06* (2013.01); *G01K 13/02* (2013.01); *G01M 15/14* (2013.01); *G01K 2013/024* (2013.01); *G01K 2205/04* (2013.01)

(56) References Cited

U.S. PATENT DOCUMENTS

| | | |
|---|---|---|
| 3,911,285 A | 10/1975 | Yannone et al. |
| 3,924,141 A | 12/1975 | Yannone et al. |
| 3,943,371 A | 3/1976 | Yannone et al. |
| 3,943,373 A | 3/1976 | Yannone et al. |
| 3,955,359 A | 5/1976 | Yannone et al. |
| 4,019,315 A | 4/1977 | Yannone et al. |
| 4,051,669 A | 10/1977 | Yannone et al. |
| 4,058,975 A | 11/1977 | Gilbert et al. |
| 4,115,998 A | 9/1978 | Gilbert et al. |
| 4,117,670 A | 10/1978 | Dombkowsi et al. |
| 4,208,591 A | 6/1980 | Yannone et al. |
| 4,242,592 A | 12/1980 | Yannone et al. |
| 4,283,634 A | 8/1981 | Yannone et al. |
| 4,314,441 A | 2/1982 | Yannone et al. |
| 4,430,046 A | 2/1984 | Cirrito |
| 4,609,328 A | 9/1986 | Cirrito |
| 4,700,542 A | 10/1987 | Wang |
| 5,058,537 A | 10/1991 | Paul et al. |
| 5,148,667 A | 9/1992 | Morey |
| 5,212,943 A | 5/1993 | Harris |
| 5,257,496 A | 11/1993 | Brown et al. |
| 5,303,684 A | 4/1994 | Brown et al. |
| 5,404,760 A | 4/1995 | Robinson et al. |
| 5,423,175 A | 6/1995 | Beebe et al. |
| 5,480,298 A | 1/1996 | Brown |
| 5,487,266 A | 1/1996 | Brown |
| 5,617,718 A | 4/1997 | Althaus |
| 5,720,165 A | 2/1998 | Rizzie et al. |
| 5,748,500 A | 5/1998 | Quentin et al. |
| 5,845,481 A | 12/1998 | Briesch et al. |
| 5,867,977 A | 2/1999 | Zachary et al. |
| 5,878,566 A | 3/1999 | Endo et al. |
| 5,930,990 A | 8/1999 | Zachary et al. |
| 5,957,063 A | 9/1999 | Koseki et al. |
| 6,003,296 A | 12/1999 | Citeno et al. |
| 6,070,404 A | 6/2000 | Bosley et al. |
| 6,095,793 A | 8/2000 | Greeb |
| 6,116,016 A | 9/2000 | Wada et al. |
| 6,155,212 A | 12/2000 | McAlister |
| 6,173,564 B1 | 1/2001 | Zachary |
| 6,244,034 B1 | 6/2001 | Taylor et al. |
| 6,260,350 B1 | 7/2001 | Horii et al. |
| 6,289,666 B1 | 9/2001 | Ginter |
| 6,306,532 B1 | 10/2001 | Kurita et al. |
| 6,405,522 B1 | 6/2002 | Pont et al. |
| 6,485,296 B1 | 11/2002 | Bender et al. |
| 6,530,210 B2 | 3/2003 | Horii et al. |
| 6,554,088 B2 | 4/2003 | Severinsky et al. |
| 6,564,556 B2 | 5/2003 | Ginter |
| 6,568,167 B2 | 5/2003 | Horii et al. |
| 6,568,168 B2 | 5/2003 | Horii et al. |
| 6,640,199 B1 | 10/2003 | Goldstein et al. |
| 6,642,720 B2 | 11/2003 | Maylotte et al. |
| 6,705,074 B2 | 3/2004 | Horii et al. |
| 6,711,888 B2 | 3/2004 | Horii et al. |
| 6,744,503 B2 | 6/2004 | Vo-Dinh et al. |
| 6,779,332 B2 | 8/2004 | Horii et al. |
| 6,782,691 B2 | 8/2004 | Nagata et al. |
| 6,796,129 B2 | 9/2004 | Yee et al. |
| 6,848,419 B1 | 2/2005 | Donaldson |
| 6,853,959 B2 | 2/2005 | Ikeda et al. |
| 6,868,663 B2 | 3/2005 | Nagata et al. |
| 6,912,856 B2 | 7/2005 | Morgan et al. |
| 6,931,856 B2 | 8/2005 | Belokon et al. |
| 6,945,030 B2 | 9/2005 | Hirayama et al. |
| RE38,831 E | 10/2005 | Horii et al. |
| 6,962,043 B2 | 11/2005 | Venkateswaran et al. |
| 6,983,603 B2 | 1/2006 | Macchia |
| 6,999,903 B2 | 2/2006 | Ikeda et al. |
| 7,032,388 B2 | 4/2006 | Healy |
| RE39,092 E | 5/2006 | Horii et al. |
| 7,040,083 B2 | 5/2006 | Horii et al. |
| 7,052,737 B2 | 5/2006 | Kool et al. |
| 7,076,940 B2 | 7/2006 | Hirayama et al. |
| 7,100,357 B2 | 9/2006 | Morgan et al. |
| 7,104,347 B2 | 9/2006 | Severinsky et al. |
| 7,117,662 B2 | 10/2006 | Hirayama et al. |
| 7,121,097 B2 | 10/2006 | Yee et al. |
| 7,124,589 B2 | 10/2006 | Neary |
| 7,127,898 B2 | 10/2006 | Healy |
| 7,140,186 B2 | 11/2006 | Venkateswaran et al. |
| 7,152,409 B2 | 12/2006 | Yee et al. |
| 7,210,297 B2 | 5/2007 | Shah et al |
| 7,237,634 B2 | 7/2007 | Severinsky et al. |
| 7,246,002 B2 | 7/2007 | Healy et al. |
| 7,310,950 B2 | 12/2007 | Dovali-Solis et al. |
| 7,320,213 B2 | 1/2008 | Shah et al. |
| 7,340,129 B2 | 3/2008 | Yalin et al. |
| 7,368,827 B2 | 5/2008 | Kulkarni et al. |
| 7,392,871 B2 | 7/2008 | Severinsky et al. |
| 7,416,137 B2 | 8/2008 | Hagen et al. |
| 7,420,662 B2 | 9/2008 | Yalin et al. |
| 7,455,134 B2 | 11/2008 | Severinsky et al. |
| 7,461,510 B1 | 12/2008 | Munson, Jr. |
| 7,497,220 B2 | 3/2009 | Asplund et al. |
| 7,513,100 B2 | 4/2009 | Motter et al. |
| 7,520,353 B2 | 4/2009 | Severinsky et al. |
| 7,523,603 B2 | 4/2009 | Hagen et al. |
| 7,559,388 B2 | 7/2009 | Severinsky et al. |
| 7,565,805 B2 | 7/2009 | Steber et al. |
| 7,582,359 B2 | 9/2009 | Sabol et al. |
| 7,593,803 B2 | 9/2009 | Healy et al. |
| 7,597,164 B2 | 10/2009 | Severinsky et al. |
| 7,618,712 B2 | 11/2009 | Sabol et al. |
| 7,734,443 B2 | 6/2010 | De et al. |
| 7,742,904 B2 | 6/2010 | Healy et al. |
| 7,788,901 B2 | 9/2010 | Huang |
| 7,808,118 B2 | 10/2010 | Berkson |
| 7,815,743 B2 | 10/2010 | Asplund et al. |
| 7,822,512 B2 | 10/2010 | Thatcher et al. |
| 7,966,802 B2 | 6/2011 | Szepek et al. |
| 7,980,082 B2 | 7/2011 | Ziminsky et al. |
| 7,997,083 B2 | 8/2011 | Meadows et al. |
| 8,004,423 B2 | 8/2011 | Mitchell et al. |
| 8,126,629 B2 | 2/2012 | Buchalter et al. |
| RE43,252 E | 3/2012 | Ginter et al. |
| 8,136,740 B2 | 3/2012 | Hagen et al. |
| 8,192,688 B2 | 6/2012 | Hagen et al. |
| 8,214,097 B2 | 7/2012 | Severinsky et al. |
| 8,265,851 B2 | 9/2012 | Girouard et al. |
| 8,280,647 B2 | 10/2012 | Stadler et al. |
| 8,297,265 B2 | 10/2012 | McAlister et al. |
| 8,370,044 B2 | 2/2013 | Dean et al. |
| 8,402,755 B2 | 3/2013 | Sengar et al. |
| 8,423,161 B2 | 4/2013 | Wilkes et al. |
| 8,437,941 B2 | 5/2013 | Chandler |
| 8,452,515 B2 | 5/2013 | Drohan et al. |
| 8,474,268 B2 | 7/2013 | Fuller et al. |
| 8,479,754 B2 | 7/2013 | Hjerpe |
| 8,510,060 B2 | 8/2013 | Hardwicke et al. |
| 2002/0099476 A1 | 7/2002 | Hamrin et al. |
| 2002/0129609 A1 | 9/2002 | Pont et al. |
| 2004/0119291 A1 | 6/2004 | Hamrin et al. |
| 2005/0198967 A1 | 9/2005 | Subramanian |
| 2006/0064986 A1 | 3/2006 | Ginter et al. |

(56) References Cited

U.S. PATENT DOCUMENTS

| | | | |
|---|---|---|---|
| 2006/0201132 A1* | 9/2006 | Hirayama | F02C 9/28 60/39.27 |
| 2007/0199299 A1 | 8/2007 | Kashmerick | |
| 2007/0234702 A1 | 10/2007 | Hagen et al. | |
| 2008/0078178 A1 | 4/2008 | Johnson | |
| 2008/0314035 A1 | 12/2008 | Evan-Beauchamp | |
| 2009/0104484 A1 | 4/2009 | Fujimura et al. | |
| 2009/0281737 A1 | 11/2009 | Stadler et al. | |
| 2010/0049417 A1 | 2/2010 | Bailey et al. | |
| 2010/0050652 A1 | 3/2010 | Skipper | |
| 2010/0117859 A1 | 5/2010 | Mitchell et al. | |
| 2010/0300062 A1* | 12/2010 | Ewens | F01D 17/08 60/39.24 |
| 2010/0300110 A1 | 12/2010 | Kraemer et al. | |
| 2010/0332103 A1 | 12/2010 | Dean et al. | |
| 2011/0094241 A1 | 4/2011 | Rodd et al. | |
| 2011/0225976 A1 | 9/2011 | Ziminsky et al. | |
| 2011/0296844 A1 | 12/2011 | Widener et al. | |
| 2012/0000403 A1 | 1/2012 | Taplin, Jr. | |
| 2012/0002035 A1 | 1/2012 | Li et al. | |
| 2012/0006032 A1 | 1/2012 | Kopcho et al. | |
| 2012/0023953 A1 | 2/2012 | Thomas et al. | |
| 2012/0036862 A1 | 2/2012 | Rabiei et al. | |
| 2012/0060510 A1 | 3/2012 | Badami et al. | |
| 2012/0072194 A1 | 3/2012 | Arnold et al. | |
| 2012/0102914 A1 | 5/2012 | Kirzhner et al. | |
| 2012/0103283 A1 | 5/2012 | Mehring et al. | |
| 2012/0150413 A1 | 6/2012 | Bunce et al. | |
| 2012/0161965 A1 | 6/2012 | Babu et al. | |
| 2012/0283963 A1 | 11/2012 | Mitchell et al. | |
| 2013/0066615 A1 | 3/2013 | Morgan et al. | |
| 2013/0074515 A1 | 3/2013 | Widener | |
| 2013/0104846 A1 | 5/2013 | McAlister | |
| 2013/0125554 A1 | 5/2013 | Mittricker et al. | |
| 2013/0125555 A1 | 5/2013 | Mittricker et al. | |
| 2013/0145748 A1 | 6/2013 | Shimizu et al. | |
| 2013/0180260 A1 | 7/2013 | Romig et al. | |

FOREIGN PATENT DOCUMENTS

| | | |
|---|---|---|
| EP | 1113943 B1 | 11/2004 |
| EP | 1522450 A2 | 4/2005 |
| EP | 2289750 A1 | 3/2011 |
| EP | 1932704 B1 | 10/2011 |
| EP | 2469041 A1 | 6/2012 |
| EP | 1662113 B1 | 11/2012 |
| EP | 2549081 A1 | 1/2013 |
| JP | 01167418 A | 7/1989 |
| JP | 2012202297 A | 10/2012 |
| WO | 9527845 A1 | 10/1995 |
| WO | 9846863 A1 | 10/1998 |
| WO | 9846869 A1 | 10/1998 |
| WO | 03072919 A1 | 9/2003 |
| WO | 2004042844 A2 | 5/2004 |
| WO | 2010123411 A1 | 10/2010 |
| WO | 2012003489 A2 | 1/2012 |
| WO | 2013077861 A1 | 5/2013 |

* cited by examiner

METHOD OF MONITORING FOR COMBUSTION ANOMALIES IN A GAS TURBOMACHINE AND A GAS TURBOMACHINE INCLUDING A COMBUSTION ANOMALY DETECTION SYSTEM

BACKGROUND OF THE INVENTION

The subject matter disclosed herein relates to the art of turbomachine and, more particularly, to a method of monitoring for combustion anomalies in a gas turbomachine and a gas turbomachine including a combustion anomaly detection system.

Turbomachines include a compressor portion linked to a turbine portion through a common compressor/turbine shaft and a combustor assembly. An inlet airflow is passed through an air intake toward the compressor portion. In the compressor portion, the inlet airflow is compressed through a number of sequential stages toward the combustor assembly. In the combustor assembly, the compressed airflow mixes with a fuel to form a combustible mixture. The combustible mixture is combusted in the combustor assembly to form hot gases. The hot gases are guided along a hot gas path of the turbine portion through a transition piece. The hot gases expand along a hot gas path through a number of turbine stages acting upon turbine bucket airfoils mounted on wheels to create work that is output, for example, to power a generator. The hot gases pass from the turbine portion through an exhaust system as exhaust gases. A number of thermocouples are arranged in the exhaust system to measure temperatures of the exhaust gases.

BRIEF DESCRIPTION OF THE INVENTION

According to an exemplary embodiment, a method of monitoring for combustion anomalies in a gas turbomachine includes sensing an exhaust gas temperature at each of a plurality of temperature sensors arranged in an exhaust system of the gas turbomachine, comparing the exhaust gas temperature at each of the plurality of temperature sensors with a mean exhaust gas temperature, determining whether the exhaust gas temperature at one or more of the plurality of temperature sensors deviates from the mean exhaust temperature by a predetermined threshold value, and identifying an instantaneous combustion anomaly at one or more of the temperature sensors sensing a temperature deviating from the mean exhaust temperature by more than the predetermined threshold value.

According to another aspect of an exemplary embodiment, a gas turbomachine system includes a compressor portion including an air inlet, and a turbine portion operatively connected to the compressor portion. The turbine portion includes an exhaust outlet. A combustor assembly is fluidically connected to the compressor portion and the turbine portion. An air intake system is fluidically connected to the air inlet, and an exhaust system is fluidically connected to the exhaust outlet. The exhaust system includes a plurality of temperature sensors configured to detect a temperature of exhaust gases passing through the exhaust system. A combustion anomaly detection system is operatively connected to each of the plurality of temperature sensors. The combustion anomaly detection system includes a computer readable storage medium having program instructions embodied therewith. The program instructions are readable by a processing circuit to cause the processing circuit to perform a method including sensing an exhaust gas temperature at each of the plurality of temperature sensors arranged in the exhaust system, comparing the exhaust gas temperature at each of the plurality of temperature sensors with a mean exhaust gas temperature, determining whether the exhaust gas temperature at one or more of the plurality of temperature sensors deviates from the mean exhaust temperature by a predetermined threshold value, and identifying an instantaneous combustion anomaly at one or more of the temperature sensors sensing a temperature deviating from the mean exhaust temperature by more than the predetermined threshold value.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
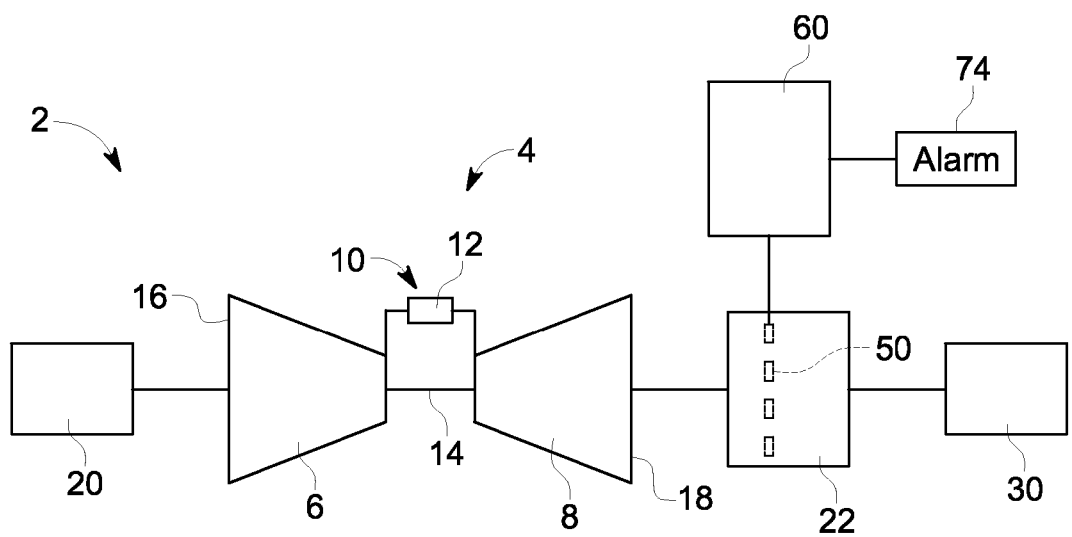
FIG. 1 is a schematic representation of a gas turbomachine including a combustion anomaly detection system, in accordance with an exemplary embodiment.

A gas turbomachine system, in accordance with an exemplary embodiment, is illustrated generally at 2, in FIG. 1. Gas turbomachine system 2 includes a gas turbomachine 4 having a compressor portion 6 fluidically connected to a turbine portion 8 through a combustor assembly 10. Combustor assembly 10 includes one or more combustors 12 which may be arranged in a can-annular array. Compressor portion 6 may also be mechanically linked to turbine portion 8 through a shaft 14. Compressor portion 6 includes an air inlet 16 and turbine portion 8 includes an exhaust outlet 18. An air intake system 20 is fluidically connected to air inlet 16. Air intake system 20 may condition air passing into compressor portion 6. For example, air intake system 20 may remove or reduce moisture that may be carried by air passing into air inlet 16. An exhaust system 22 is fluidically connected to exhaust outlet 18. Exhaust system 22 may condition exhaust gases passing from turbine portion 8 prior to introduction to ambient. Gas turbomachine system 2 may also include a driven load 30 that could take the form of a generator, a pump, or a vehicle.

Figure 2:
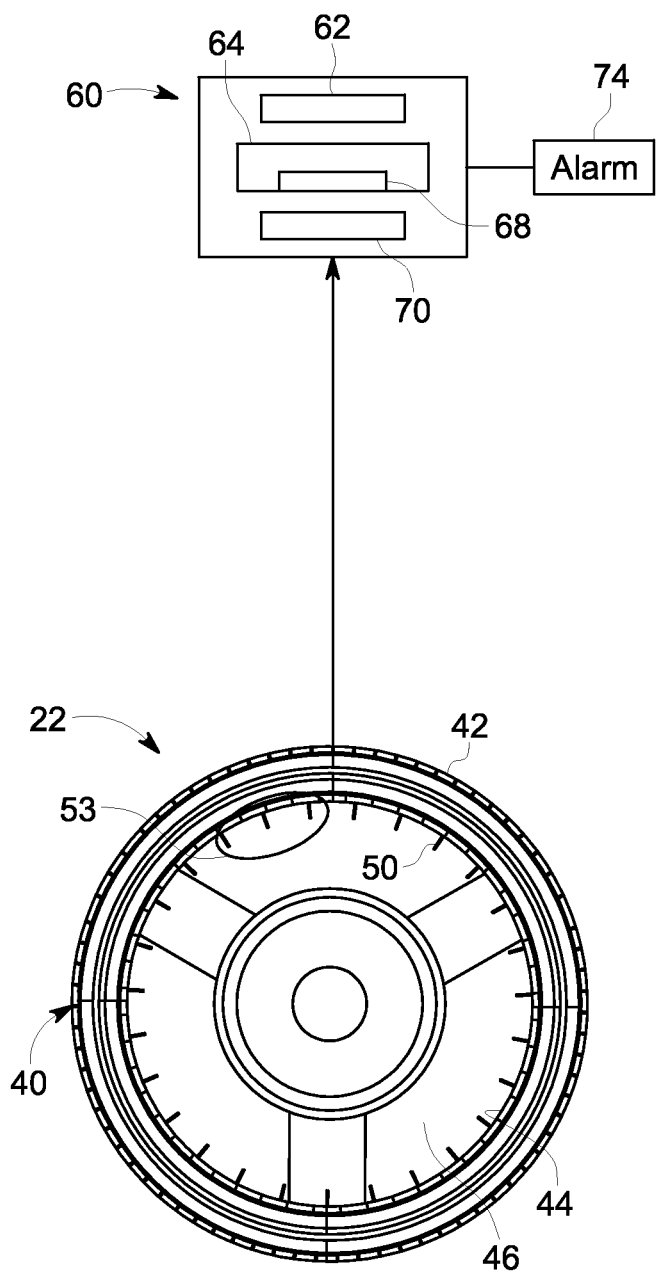
FIG. 2 is an axial view of an exhaust system of the gas turbomachine of FIG. 1.

As shown in FIG. 2, exhaust system 22 includes a housing 40 having an outer surface 42 and an inner surface 44 that defines an exhaust gas flow path 46. Exhaust system 22 includes a plurality of temperature sensors, one of which is indicated at 50, arranged on housing 40. Temperature sensors 50 may take the form of thermocouples that are circumferentially arrayed about inner surface 44 and exposed to exhaust gas flow path 46. In accordance with an aspect of an exemplary embodiment, one or more temperature sensors 50 may be arranged in a group 53 with exhaust gas system 22 including multiple groups of temperature sensors. In accordance with another aspect of an exemplary embodiment, each group may include three temperature sensors.

In accordance with an exemplary embodiment, gas turbomachine system 2 includes a combustor anomaly detection system 60 operatively connected to each of the plurality of temperature sensors 50. It should be understood that combustor anomaly detection system 60 may be co-located with gas turbomachine 4, or may be in a central global monitoring station. Thus, combustor anomaly detection system 60 may receive data from and simultaneously monitor multiple gas turbomachine systems located anywhere in the world from a single monitoring location. In contrast to prior art systems in which combustion anomalies are detected by reviewing exhaust gas temperature trends over time, combustor anomaly detection system 60 identifies the presence of instantaneous hot and/or cold spots in exhaust system 22. Combustor anomaly detection system 60 includes a CPU 62, a computer readable storage medium 64 provided with a set of program instructions 68 and a memory 70. As will be discussed more fully below, combustor anomaly detection system 60 is operatively connected to an alarm 74 that may provide a visual and/or an audible alarm upon detecting a combustion anomaly as will be detailed below.

Figure 3:
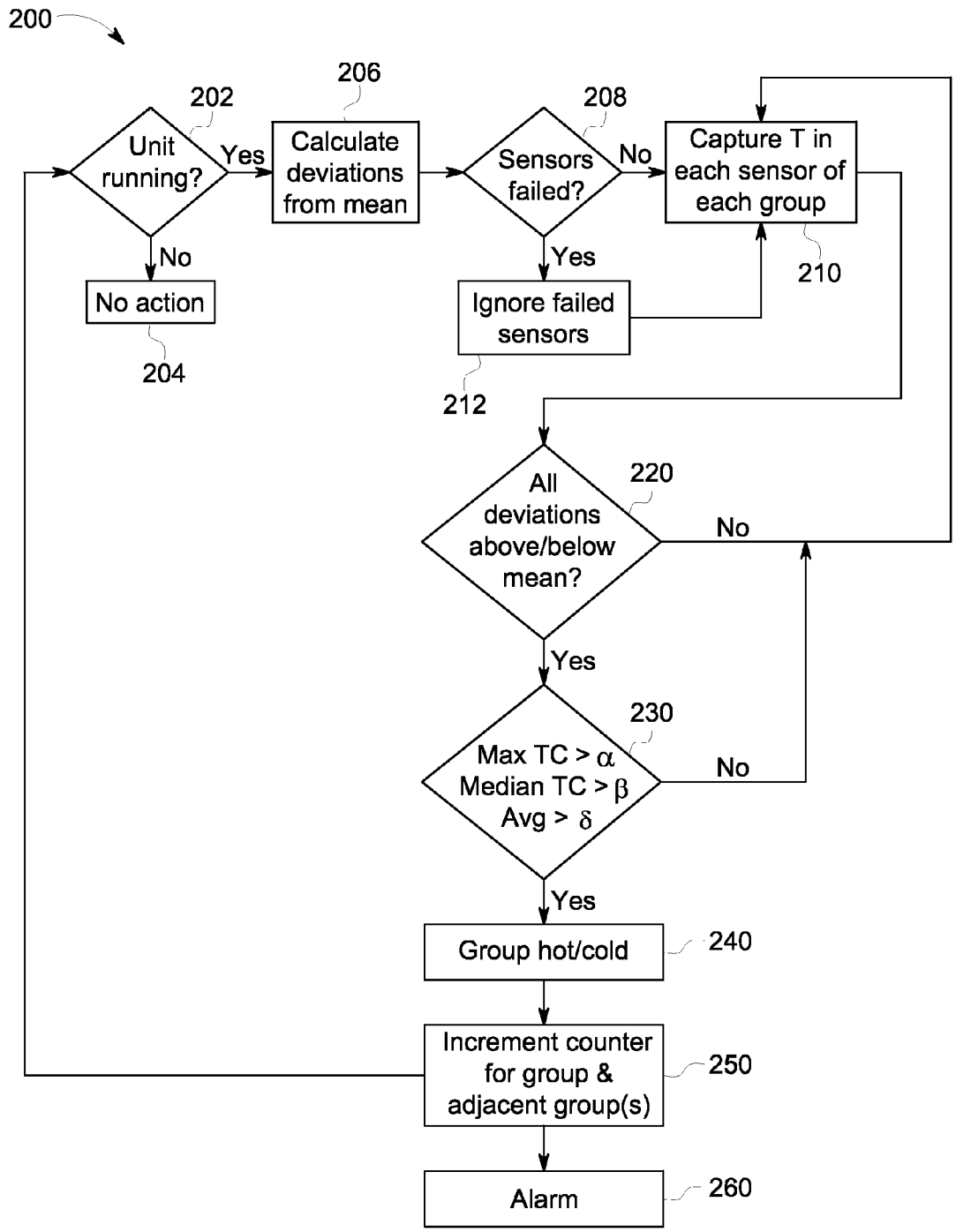
FIG. 3 depicts a flow chart illustrating a method of detecting combustion anomalies, in accordance with an exemplary embodiment.

As shown in FIG. 3, a method 200 of detecting combustion anomalies is embedded in program instructions 68. Initially, combustion anomaly detection system 60 determines whether gas turbomachine 4 has been running for a predetermine period of time in block 202. If gas turbomachine 4 has not been running for the predetermined time period, no action is taken as shown in block 204. If, gas turbomachine 4 has been running for at least the predetermined period of time, an exhaust gas temperature is collected from each temperature sensor 50 and compared to a mean exhaust gas temperature in block 206. A determination is made in block 208 whether any of temperature sensors 50 have failed. A sensor is deemed as being failed if the sensed temperature deviates from the mean exhaust gas temperature by more than a threshold value. In one example, the threshold value may be ±300° F. (149° C.). Of course, it should be understood that the threshold value may vary.

If no failed temperature sensors are indicated, a temperature is captured at each temperature sensor 50 in each group 53 in block 210. If, in block 208, failed temperature sensors are indicated, those sensors are flagged as to be ignored, and new groups established, in block 212, and temperatures are collected at any remaining temperature sensors in each new group in block 210. In block 220 a determination is made whether any one of temperature sensors 50 sense a temperature that deviates, either above or below, the mean exhaust temperature. Combustion anomaly detection system 60 may look at each sensor 50 individually, or may look at each sensor 50 in each group 53. If all temperature sensors 50 report temperatures that indicate similar deviations from the mean exhaust temperature, additional comparisons are made in step 230. If, however, one or more of the temperature sensors 50 deviate differently than others of the temperature sensors 50, method 200 returns to step 210.

For example, in block 230, combustion anomaly detection system 60 may look at all sensors 50 in a group and determine whether a maximum sensed temperature in the group is greater than a first threshold value α, whether a median sensed temperature of the group is greater than a second threshold value β, and whether an average temperature of the group is greater than a third threshold value δ. Of course it should be understood that the value of each of the first, second and third threshold values may vary depending upon particulars of the gas turbomachine 4. If one or more of the maximum sensed temperature, median sensed temperature, and average sensed temperature exceeds the corresponding one of the first, second, and third threshold values, the group is flagged as indicating an instantaneous combustion anomaly, in block 240, and stored in memory 70, a counter is incremented in block 250 and method returns to block 202 to detect temperatures for a second time period. If the combustion anomaly persists for a predetermine period, e.g., the group is repeatedly flagged as indicating the combustion anomaly for consecutive time periods, combustor anomaly detection system 60 may generate an alarm 74 indicating that an anomaly persists in exhaust system 22. In accordance with one aspect of the exemplary embodiment, if the group is flagged as indicting an anomaly in each of 40 consecutive one minute time periods, alarm 74 may be activated in block 260. Of course the duration of each period, and the number of consecutive periods having an anomaly to indicate persistence may vary.

At this point it should be understood that the exemplary embodiment provides a system and method for detecting combustion anomalies in an exhaust system of a gas turbomachine. In contrast to prior art systems that rely on temperature trends over time, the exemplary embodiment identifies an instantaneous combustion anomaly, determines whether the anomaly persists, and sounds an alarm if the anomaly persists for a predetermined time period.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of monitoring for combustion anomalies in a gas turbomachine, the method comprising:

sensing an exhaust gas temperature at each of a plurality of temperature sensors arranged in an exhaust system of the gas turbomachine;

comparing the exhaust gas temperature at each of the plurality of temperature sensors with a mean exhaust temperature;

determining whether the exhaust gas temperature at one or more of the plurality of temperature sensors deviates from the mean exhaust temperature by a predetermined threshold value; and identifying an instantaneous combustion anomaly at one or more of the plurality of temperature sensors sensing a temperature deviating from the mean exhaust temperature by more than the predetermined threshold value, further comprising:

combining one or more of the plurality of temperature sensors into a group, and determining whether each of the one or more of the plurality of temperature sensors in the group senses a temperature deviating from the mean exhaust temperature; and determining a maximum sensed temperature detected by one or more of the plurality of temperature sensors in the group, a mean sensed temperature detected by the one or more of the plurality of temperature sensors in the group; and determining an average sensed temperature detected by the one or more of the plurality of temperature sensors in the group if all of the plurality of temperature sensors in the group sense a temperature deviating from the mean exhaust temperature.

2. The method of claim 1, further comprising: comparing the maximum sensed temperature with a first threshold value, the mean sensed temperature with a second threshold value, and the average temperature with a third threshold value.

3. The method of claim 2, wherein identifying the instantaneous combustion anomaly includes determining that one of the maximum sensed temperature exceeds the first threshold value, the mean sensed temperature exceeds the second threshold value, and the average sensed temperature exceeds the third threshold value.

4. The method of claim 1, further comprising: triggering an alarm to indicate the instantaneous combustion anomaly.

5. The method of claim 1, further comprising: identifying the instantaneous combustion anomaly for each of a plurality of consecutive time periods.

6. The method of claim 5, further comprising: triggering an alarm to indicate the instantaneous combustion anomaly if the instantaneous combustion anomaly is indicated for a predetermined number of consecutive time periods.

7. The method of claim 5, wherein each of the plurality of consecutive time periods comprises one (1) minute.

8. A system comprising:
a compressor portion including an air inlet;
a turbine portion operatively connected to the compressor portion, the turbine portion including an exhaust outlet;
a combustor assembly fluidically connected to the compressor portion and the turbine portion;
an air intake system fluidically connected to the air inlet;
an exhaust system fluidically connected to the exhaust outlet, the exhaust system including a plurality of temperature sensors configured to detect a temperature of exhaust gases passing through the exhaust system; and
a combustion anomaly detection system operatively connected to each of the plurality of temperature sensors, the combustion anomaly detection system including a computer readable storage medium having program instructions embodied therewith, the program instructions readable by a processing circuit for:
sensing an exhaust gas temperature at each of the plurality of temperature sensors arranged in the exhaust system;
comparing the exhaust gas temperature at each of the plurality of temperature sensors with a mean exhaust gas temperature;
determining whether the exhaust gas temperature at one or more of the plurality of temperature sensors deviates from the mean exhaust temperature by a predetermined threshold value; and identifying an instantaneous combustion anomaly at one or more of the plurality of temperature sensors sensing a temperature deviating from the mean exhaust temperature by more than the predetermined threshold value, wherein, the program instructions readable by a processing circuit to cause the processing circuit to combine one or more of the plurality of temperature sensors into a group and to determine whether each of the one or more of the plurality of temperature sensors in the group senses a temperature deviating from the mean exhaust temperature, and wherein, the program instructions readable by a processing circuit to cause the processing circuit to determine:

a maximum sensed temperature detected by one or more of the plurality of temperature sensors in the group; and a mean sensed temperature detected by the one or more of the plurality of temperature sensors in the group; and an average sensed temperature detected by the one or more of the plurality of temperature sensors in the group if all of the plurality of temperature sensors in the group sense a temperature deviating from the mean exhaust temperature.

9. The system according to claim 8, wherein, the program instructions readable by a processing circuit to cause the processing circuit to compare the maximum sensed temperature with a first threshold value, the mean sensed temperature with a second threshold value, and the average temperature with a third threshold value.

10. The system according to claim 9, wherein identifying the instantaneous combustion anomaly includes determining that one of the maximum sensed temperature exceeds the first threshold value, the mean sensed temperature exceeds the second threshold value, and the average sensed temperature exceeds the third threshold value.

11. The system according to claim 8, wherein, the program instructions readable by a processing circuit to cause the processing circuit to trigger an alarm to indicate the instantaneous combustion anomaly.

12. The system according to claim 8, wherein, the program instructions readable by a processing circuit to cause the processing circuit to identify the instantaneous combustion anomaly for each of a plurality of consecutive time periods.

13. The system according to claim 12, wherein, the program instructions readable by a processing circuit to cause the processing circuit to trigger an alarm to indicate the instantaneous combustion anomaly if the instantaneous combustion anomaly is indicated for a predetermined number of consecutive time periods.

14. The system according to claim 12, wherein each of the plurality of consecutive time periods comprises one (1) minute.

* * * * *